(12) United States Patent
Shaw

(10) Patent No.: US 8,001,382 B2
(45) Date of Patent: Aug. 16, 2011

(54) SYSTEM FOR AND METHOD OF MONITORING AN ITEM

(75) Inventor: Grant Langley Hohepa Shaw, Duncraig (AU)

(73) Assignee: Shaw IP Pty. Ltd., West Perth (AU)

( * ) Notice: Subject to any disclaimer, the term of this patent is extended or adjusted under 35 U.S.C. 154(b) by 1657 days.

(21) Appl. No.: 10/559,178

(22) PCT Filed: Jun. 4, 2004

(86) PCT No.: PCT/AU2004/000735
§ 371 (c)(1),
(2), (4) Date: Dec. 1, 2005

(87) PCT Pub. No.: WO2004/109564
PCT Pub. Date: Dec. 16, 2004

(65) Prior Publication Data
US 2006/0247984 A1    Nov. 2, 2006

(30) Foreign Application Priority Data

Jun. 4, 2003    (AU) ................................ 2003902796

(51) Int. Cl.
*H04L 9/32* (2006.01)
*G06F 7/04* (2006.01)
(52) U.S. Cl. .............. 713/170; 713/186; 726/5; 726/28; 705/66; 705/67
(58) Field of Classification Search ................ 726/5, 20, 726/28; 713/150, 170, 172, 186; 709/206, 709/229; 705/1, 28, 30, 51, 64, 65, 66, 67, 705/72; 340/5.74, 5.82
See application file for complete search history.

(56) References Cited

U.S. PATENT DOCUMENTS

| 6,591,252 B1 | 7/2003 | Young |
| 6,612,494 B1 | 9/2003 | Outwater |
| 6,839,453 B1 | 1/2005 | McWilliam et al. |

(Continued)

FOREIGN PATENT DOCUMENTS

JP    2002-157570    5/2002

(Continued)

OTHER PUBLICATIONS

International Search Report dated Jul. 20, 2004.

*Primary Examiner* — Andrew Joseph Rudy
(74) *Attorney, Agent, or Firm* — Nixon & Vanderhye P.C.

(57) ABSTRACT

A system for monitoring an item including a plurality of item identification devices, each item identification device including unique information indicative of the item and being disposed during use on the item, a plurality of supplier identification devices, each supplier identification device including stored supplier biometric data indicative of the identity of a representative of a supplier of the item. The system also includes means for verifying the identity of the representative of the supplier using the stored supplier biometric data and biometric data gathered directly from the representative of the supplier, a plurality of recipient identification devices, each recipient identification device being associated with a recipient of an item and including stored recipient biometric data indicative of the identity of the recipient, means for verifying the identity of a recipient using the stored recipient biometric data and biometric data gathered directly from the recipient, and a database for storing a plurality of item records.

32 Claims, 8 Drawing Sheets

U.S. PATENT DOCUMENTS

| | | |
|---|---|---|
| 7,110,976 B2 * | 9/2006 | Heimermann et al. .......... 705/37 |
| 7,117,370 B2 * | 10/2006 | Khan et al. .................... 713/186 |
| 7,120,607 B2 * | 10/2006 | Bolle et al. ...................... 705/64 |
| 7,240,025 B2 * | 7/2007 | Stone et al. ................. 705/14.16 |
| 7,774,279 B2 * | 8/2010 | Wang et al. ...................... 705/51 |
| 2001/0033916 A1 | 10/2001 | McCormick et al. |
| 2002/0116508 A1 * | 8/2002 | Khan et al. .................... 709/229 |
| 2002/0178363 A1 | 11/2002 | Ambrogio et al. |
| 2003/0046543 A1 | 3/2003 | Houston et al. |
| 2003/0097307 A1 | 5/2003 | Greene |
| 2003/0130912 A1 | 7/2003 | Davis et al. |
| 2004/0088231 A1 | 5/2004 | Davis |
| 2005/0240581 A1 * | 10/2005 | Smith et al. ....................... 707/5 |

FOREIGN PATENT DOCUMENTS

| | | |
|---|---|---|
| WO | WO 0145024 | 6/2001 |
| WO | WO 03034307 | 4/2003 |

* cited by examiner

| No. | RFID1 | MANUFACTURER | ITEM | PERSONAL DATA 1 | RFID2 | SELLER | PERSONAL DATA 2 | RFID3 | PURCHASER | PERSONAL DATA 3 |
|---|---|---|---|---|---|---|---|---|---|---|
| 1 | | | | | | | | | | |
| 2 | | | | | | | | | | |
| 3 | | | | | | | | | | |
| 4 | | | | | | | | | | |
| 5 | | | | | | | | | | |
| 6 | | | | | | | | | | |
| 7 | | | | | | | | | | |

Fig. 6

SYSTEM FOR AND METHOD OF MONITORING AN ITEM

This application is the US national phase of international application PCT/AU2004/000735 filed 4 Jun. 2004 which designated the U.S. and claims benefit of Australian provisional application 2003902796 filed 4 Jun. 2003, the entire contents of both are hereby incorporated by reference.

FIELD OF THE INVENTION

The present invention relates to a system for monitoring an item, to a method of monitoring an item, and in particular to a system for and method of monitoring manufacture, sale and purchase of an item.

BACKGROUND OF THE INVENTION

It is known to monitor supply of an item by creating a database record including details of the type of item, details of the seller of the item, and details of the purchaser of the item.

However, with such a system, once an item has been sold it is difficult if not impossible to trace the manufacturer of the item, the seller of the item and/or the valid owner of the item and, for this reason, it is often difficult to quickly establish whether an item is counterfeit or has been stolen. Also, in the event of occurrence of a fault with the item, it is often difficult to attribute responsibility for the fault with the appropriate individual(s) associated with the item manufacturer.

In this specification, it will be understood that the term "item" refers to any article which is to be supplied to a recipient, including a purchasable article, an item of property such as a house the ownership of which is to be transferred to a purchaser, an article of luggage, and so on. It will also be understood that the term "supplier" refers to any individual or organisation involved in transferring an item from one individual or organisation to another individual or organisation. Examples of "suppliers" include manufacturers, sellers, luggage handlers and transportation organisations, and so on.

SUMMARY OF THE INVENTION

In accordance with a first aspect of the present invention, there is provided a system for monitoring an item, said system comprising:

a plurality of item identification devices, each item identification device including unique information indicative of the item and being disposed during use on an item;

a plurality of supplier identification devices, each supplier identification device including stored supplier biometric data indicative of the identity of a representative of a supplier of the item;

means for verifying the identity of the representative of the supplier using the stored supplier biometric data and biometric data gathered directly from the representative of the supplier;

a plurality of recipient identification devices, each recipient identification device being associated with a recipient of an item and including stored recipient biometric data indicative of the identity of the recipient;

means for verifying the identity of a recipient using the stored recipient biometric data and biometric data gathered directly from the recipient; and a database for storing a plurality of item records, each item record including unique information indicative of an item, information indicative of the identity of the representative of a supplier of the item when the identity of the representative of the supplier has been verified, and information indicative of the identity of a recipient of the item when the identity of the recipient has been verified.

In one arrangement, each supplier identification device comprises a manufacturer identification device including stored manufacturer biometric data indicative of the identity of a representative of a manufacturer of the item, or a seller identification device including stored seller biometric data indicative of the identity of a representative of a seller of the item.

In an alternative arrangement, each supplier identification device comprises a manufacturer identification device including stored manufacturer biometric data indicative of the identity of a representative of the manufacturer of the item, and the system further comprises:

a seller identification device including stored seller biometric data indicative of the identity of a representative of the seller of the item, and means for verifying the identity of the representative of the seller using the stored seller biometric data and biometric data gathered directly from the representative of the seller.

In one embodiment, each manufacturer identification device includes a manufacturer tag capable of storing a manufacturer identifier indicative of the name of the manufacturer. Each manufacturer identification device may comprise an item identification device, and may include information indicative of the name of the representative of the manufacturer. The manufacturer tag may comprise a manufacturer RFID tag.

The system may further comprise a first scanner arranged to read the manufacturer tag and the item tag.

The item identification device may be affixed to an item or may be incorporated into an item during manufacture of the item.

In one arrangement, the manufacturer identification device includes a manufacturer biometric tag and the manufacturer biometric data is stored in the manufacturer biometric tag in the form of a visible representation of a fingerprint, a visible representation of an iris, a visible holographic representation of facial features, or a representation of DNA.

The manufacturer identification device may include a first data storage device and the manufacturer biometric data may be stored in the first data storage device.

The manufacturer identification device may be incorporated into a mobile phone, a credit card, a passport or an identity card.

The system may further comprise a first detector arranged to read the manufacturer biometric data and a first biometric reader arranged to read biometric data directly from a manufacturer representative.

In one embodiment, each seller identification device comprises a seller tag capable of storing a seller identifier indicative of the name of a seller. Each seller tag may include information indicative of the name of the representative of the seller. Each seller tag may comprise a seller RFID tag.

The system may further comprise a second scanner arranged to read the seller tag.

The seller identification device may be included in a receipt provided by the seller to a recipient on purchase of an item.

In one arrangement, the seller identification device includes a seller biometric tag and the seller biometric data is stored in the seller biometric tag in the form of a visible representation of a fingerprint, a visible representation of an iris, a visible holographic representation of facial features, or a representation of DNA.

The seller identification device may include a second data storage device and the seller biometric data may be stored in the second data storage device.

The seller identification device may be incorporated into a mobile phone, a credit card, a passport or an identity card.

The system may further comprise a second detector arranged to read the seller biometric data and a second biometric reader arranged to read biometric data directly from a seller representative.

In one embodiment, each recipient identification device includes a recipient tag capable of storing a recipient identifier indicative of the name of the recipient. The recipient identification device may be incorporated into a mobile phone, a credit card, a passport or an identity card.

In one arrangement, the recipient identification device comprises a recipient biometric tag and the recipient biometric data is stored in the recipient biometric tag in the form of a visible representation of a fingerprint, a visible representation of an iris, a visible holographic representation of facial features, or a representation of DNA.

The recipient identification device may include a third data storage device and the recipient biometric data may be stored in the third data storage device.

Preferably, the second scanner is arranged to read the recipient identifier, the second detector is arranged to read the recipient biometric data and the second biometric reader is arranged to read biometric data directly from a recipient.

In one arrangement, the supplier is a luggage handling organisation, the recipient is an owner of the luggage, and the item is an article of luggage to be transported from one location to another location.

In accordance with a second aspect of the present invention, there is provided a method of monitoring an item, said method including the steps of:
  providing a plurality of item identification devices, each item identification device including unique information indicative of an item;
  providing a plurality of supplier identification devices, each supplier identification device including stored supplier biometric data indicative of the identity of a representative of a supplier of the item;
  disposing each item identification device on an item;
  verifying the identity of the representative of the supplier using the stored supplier biometric data and biometric data gathered directly from the representative of the supplier;
  providing a plurality of recipient identification devices, each recipient identification device being associated with a recipient of an item and including stored recipient biometric data indicative of the identity of the recipient;
  verifying the identity of a recipient using the stored recipient biometric data and biometric data gathered directly from the recipient; and
  storing a plurality of item records in a database, each item record including unique information indicative of an item, information indicative of the identity of the representative of a supplier of the item when the identity of the representative of the supplier has been verified, and information indicative of the identity of a recipient of the item when the identity of the recipient has been verified.

In one arrangement, the step of providing a plurality of supplier identification devices comprises the steps of providing a plurality of manufacturer identification devices and storing on each manufacturer identification device manufacturer biometric data indicative of the identity of a representative of a manufacturer of the item, or providing a plurality of seller identification devices and storing on each seller identification device seller biometric data indicative of the identity of a representative of a seller of the item.

In an alternative arrangement, the step of providing a plurality of supplier identification devices comprises the steps of providing a plurality of manufacturer identification devices and storing on each manufacturer identification device manufacturer biometric data indicative of the identity of a representative of the manufacturer of the item, and the method further comprises the steps of:
  providing a plurality of seller identification devices;
    storing on each seller identification device seller biometric data indicative of the identity of a representative of a seller of the item; and
    verifying the identity of the representative of the seller using the stored seller biometric data and biometric data gathered directly from the representative of the seller.

In one embodiment, the method further comprises the step of providing each manufacturer identification device with a manufacturer tag capable of storing a manufacturer identifier indicative of the name of the manufacturer. Each manufacturer tag may comprise an item identification device, and each manufacturer tag may be provided with information indicative of the name of the representative of the manufacturer. The manufacturer tag may comprise a manufacturer RFID tag.

The method may further comprise the step of providing a first scanner arranged to read the manufacturer tag and the item tag.

The method may further comprise the step of affixing the item identification device to an item or the step of incorporating the item identification device into an item during manufacture of the item.

In one arrangement, the method further comprises the steps of providing the manufacturer identification device with a manufacturer biometric tag and storing the manufacturer biometric data on the manufacturer biometric tag in the form of a visible representation of a fingerprint, a visible representation of an iris, a visible holographic representation of facial features, or a representation of DNA.

The method may further comprise the steps of providing the manufacturer identification device with a first data storage device and storing the manufacturer biometric data on the first data storage device.

The manufacturer identification device may be incorporated into a mobile phone, a credit card, a passport or an identity card.

The method may further comprise the steps of providing a first detector arranged to read the manufacturer biometric data and providing a first biometric reader arranged to read biometric data directly from a manufacturer representative.

In one embodiment, the method further comprises the step of providing each seller identification device with a seller tag capable of storing a seller identifier indicative of the name of a seller. Each seller tag may be provided with information indicative of the name of the representative of the seller. Each seller tag may comprise a seller RFID tag.

The method further comprise the step of providing a second scanner arranged to read the seller tag.

The method may further including the step of including the seller identification device in a receipt provided by the seller to a recipient on purchase of an item.

In one arrangement, the method further comprises the steps of providing the seller identification device with a seller biometric tag and storing the seller biometric data on the seller biometric tag in the form of a visible representation of a fingerprint, a visible representation of an iris, a visible holographic representation of facial features, or a representation of DNA.

The method may further comprise the steps of providing the seller identification device with a second data storage device and storing the seller biometric data in the second data storage device.

The seller identification device may be incorporated into a mobile phone, a credit card, a passport or an identity card.

The method further comprise the steps of providing a second detector arranged to read the seller biometric data and providing a second biometric reader arranged to read biometric data directly from a seller representative.

In one embodiment, the method further comprises the step of providing each recipient identification device with a recipient tag capable of storing a recipient identifier indicative of the recipient. The recipient identification device may be included in a mobile phone, credit card, a passport or an identity card.

In one arrangement, the method further comprises the steps of providing the recipient identification device with a recipient biometric tag and storing the recipient biometric data in the recipient biometric tag in the form of a visible representation of a fingerprint, a visible representation of an iris, a visible holographic representation of facial features, or a representation of DNA.

The method may further comprise the steps of providing the recipient identification device with a third data storage device and storing the recipient biometric data in the third data storage device.

Preferably, the second scanner is arranged to read the recipient identifier, the second detector is arranged to read the recipient biometric data and the second biometric reader is arranged to read biometric data directly from a recipient.

In one arrangement, the supplier is a luggage handling organisation, the recipient is an owner of the luggage, and the item is an article of luggage to be transported from one location to another location.

In accordance with a third aspect of the present invention, there is provided a system for monitoring an item, said system including:
  a database for storing a plurality of item records; and
  communications means arranged to facilitate transfer of information to the database from a remote location;
  wherein for each item the database is arranged to receive and store in an item record information indicative of the item, supplier biometric information indicative of a representative of a supplier of the item, and recipient biometric information indicative of a recipient of the item.

The supplier biometric data may be stored in the form of a representation of a fingerprint, a representation of an iris, a representation of facial features, or a representation of DNA.

The recipient biometric data may be stored in the form of a representation of a fingerprint, a representation of an iris, a representation of facial features, or a representation of DNA.

Each item record may include information indicative of the name of a representative of a manufacturer of the item.

Each item record may include information indicative of the name of a representative of a seller of the item.

In accordance with a fourth aspect of the present invention, there is provided a method of monitoring an item, said method including the steps of:
  providing a database for storing a plurality of item records;
  facilitating transfer of information to the database from a remote location; and
  arranging the database to receive and store in an item record information indicative of the item, supplier biometric information indicative of the identity of a representative of a supplier of the item, and recipient biometric information indicative of a recipient of the item.

The method may further comprise the step of storing the supplier biometric data in the form of a representation of a fingerprint, a representation of an iris, a representation of facial features, or a representation of DNA.

The method may further comprise the step of storing the recipient biometric data in the form of a representation of a fingerprint, a representation of an iris, a representation of facial features, or a representation of DNA.

Each item record may include information indicative of the name of a, representative of a manufacturer of the item.

Each item record may include information indicative of the name of a representative of a seller of the item.

BRIEF DESCRIPTION OF THE DRAWINGS

The present invention will now be described, by way of example only, with reference to the accompanying drawings, in which:

FIG. 6 is a diagrammatic representation of records stored in a database of the system shown in FIG. 1.

DESCRIPTION OF A PREFERRED EMBODIMENT OF THE PRESENT INVENTION

Figure 1:
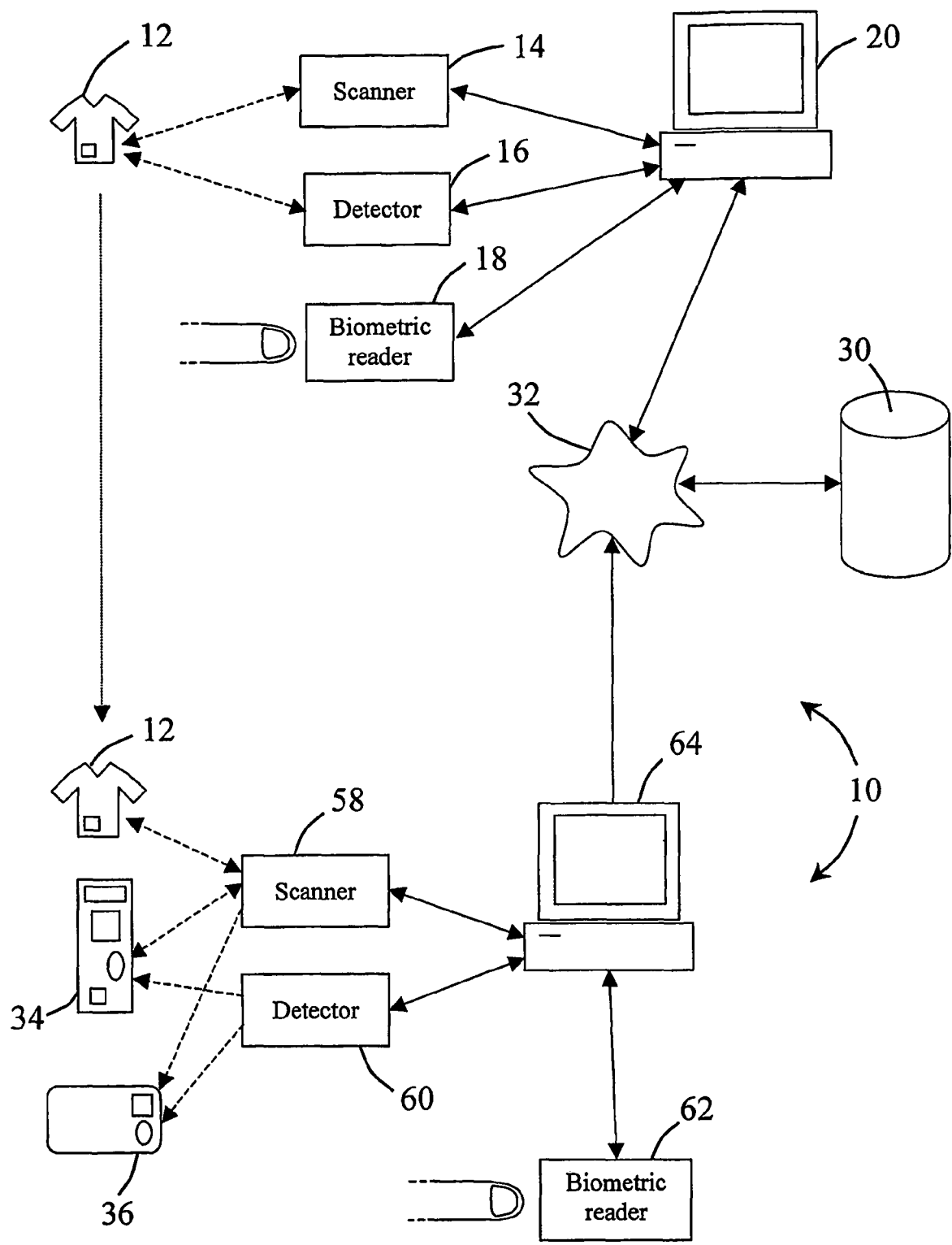
FIG. 1 is a diagrammatic representation of a system for monitoring supply of an item in accordance with an embodiment of the present invention.

Referring to FIG. 1 of the drawings, there is shown a monitoring system 10 for monitoring supply of an item 12 to a recipient. In this example, the item 12 is a garment, although it will be understood that the item 12 may be any article which is to be supplied to a recipient.

The system 10 includes a first scanner 14 for scanning and reading stored item and manufacturer identification information, a first detector 16 for detecting and reading stored biometric data, a first biometric reader 18 for reading biometric data directly from a person, and a first computing device 20 for controlling and coordinating operation of the first scanner 14, the first detector 16 and the first biometric reader 18, and for forwarding information gathered from the first scanner 14, the first detector 16 and the first biometric reader 18 to a remote database 30.

In the present example, the first scanner 14, the first detector 16, the first biometric reader 18 and the first computing device 20 are located on site at a manufacturer of the item 12.

Figure 2:
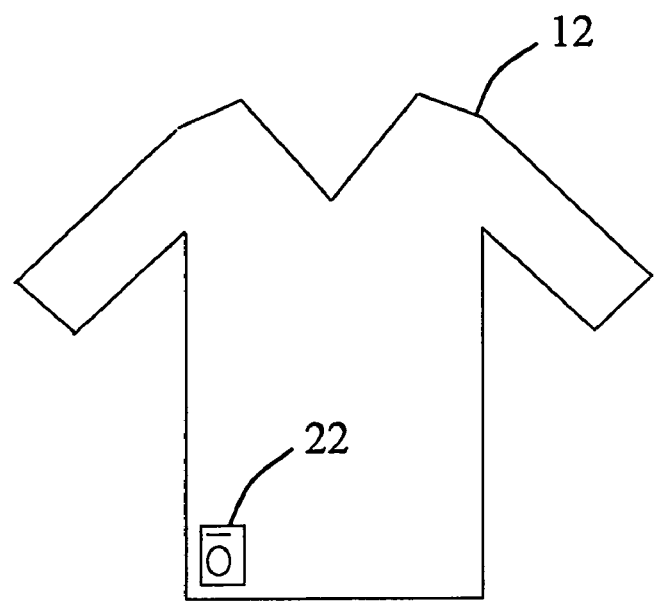
FIG. 2 is a diagrammatic representation of an item for use with the system shown in FIG. 1.
Figure 3:
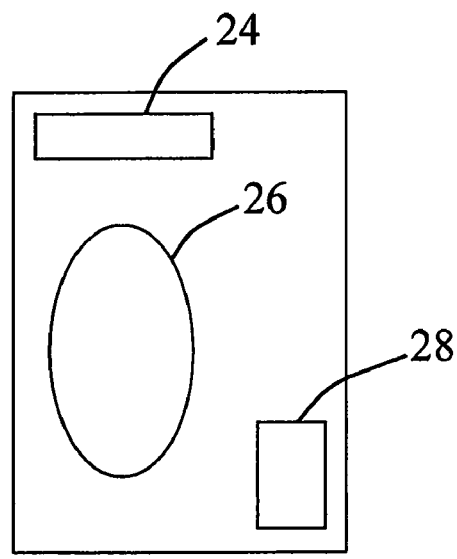
FIG. 3 is a diagrammatic representation of a manufacturer identification device for disposing on the item shown in FIG. 2.

Subsequent to manufacture of the item 12, a manufacturer identification device 22 as shown more particularly in FIGS. 2 and 3 is disposed on the item 12, for example by affixing the manufacturer identification device 22 to the item 12. However, it will be understood that instead of affixing the manufacturer identification device 22 to the item 12, the manufacturer identification device 22 may be incorporated into the item 12, for example by incorporating components of the manufacturer identification device 22 into the fabric of the item 12 during manufacture of the item 12.

The manufacturer identification device 22 includes a manufacturer tag, in this example a manufacturer radio frequency identification (RFID) tag 24 on which is stored a unique manufacturer identifier which is readable by the first scanner 14 and which is indicative of the manufacturer and a representative of the manufacturer, and which incorporates an item identification device indicative of the item. The representative may be a person contributing to manufacture of the item 12 or a person authorised by the manufacturer to verify item manufacture.

The manufacturer identification device 22 also includes a manufacturer biometric tag, in this example in the form of a visible representation of a fingerprint 26 of a manufacturer representative, although it will be understood that the manufacturer biometric tag may take various forms, including a first data storage device 28 arranged to store biometric data unique to a person, and may include other types of biometric data such as a visible representation of an iris of the manufacturer representative, a visible holographic representation of facial features of the manufacturer representative, a representation of DNA of the manufacturer representative, and so on, the important aspect being that the manufacturer biometric tag includes stored biometric data which is unique to the manufacturer representative and which is readable by the first detector 16.

While the present example is described in relation to a manufacturer identification device incorporating an item identification device and which is affixed to or incorporated into an item, it will be understood that other arrangements are possible. The manufacturer identification device 22 may be separate to the item identification device and, in this circumstance, an item identification device could be affixed to or incorporated into an item so as to facilitate identification of the item 12 using a suitable scanner 14, and a separate manufacturer identification device provided to verify the identity of a representative of the manufacturer. Such an alternative manufacturer identification device may take various forms, the important aspect being that the manufacturer identification device is capable of storing an identifier unique to the representative of the manufacturer and biometric data unique to the representative of the manufacturer. For example, the manufacturer identification device may take the form of a mobile phone provided with a readable storage device such as an integrated circuit or an RFID tag on which a unique identifier and unique biometric data are stored. Such an item identification device may take various forms, such as a data storage device, RFID tag, and so on.

The system 10 also includes a seller identification device 34, in this example in the form of a receipt generated and provided to a purchaser of the item 12, and a recipient identification device, in this example in the form of a credit card 36.

Figure 4:
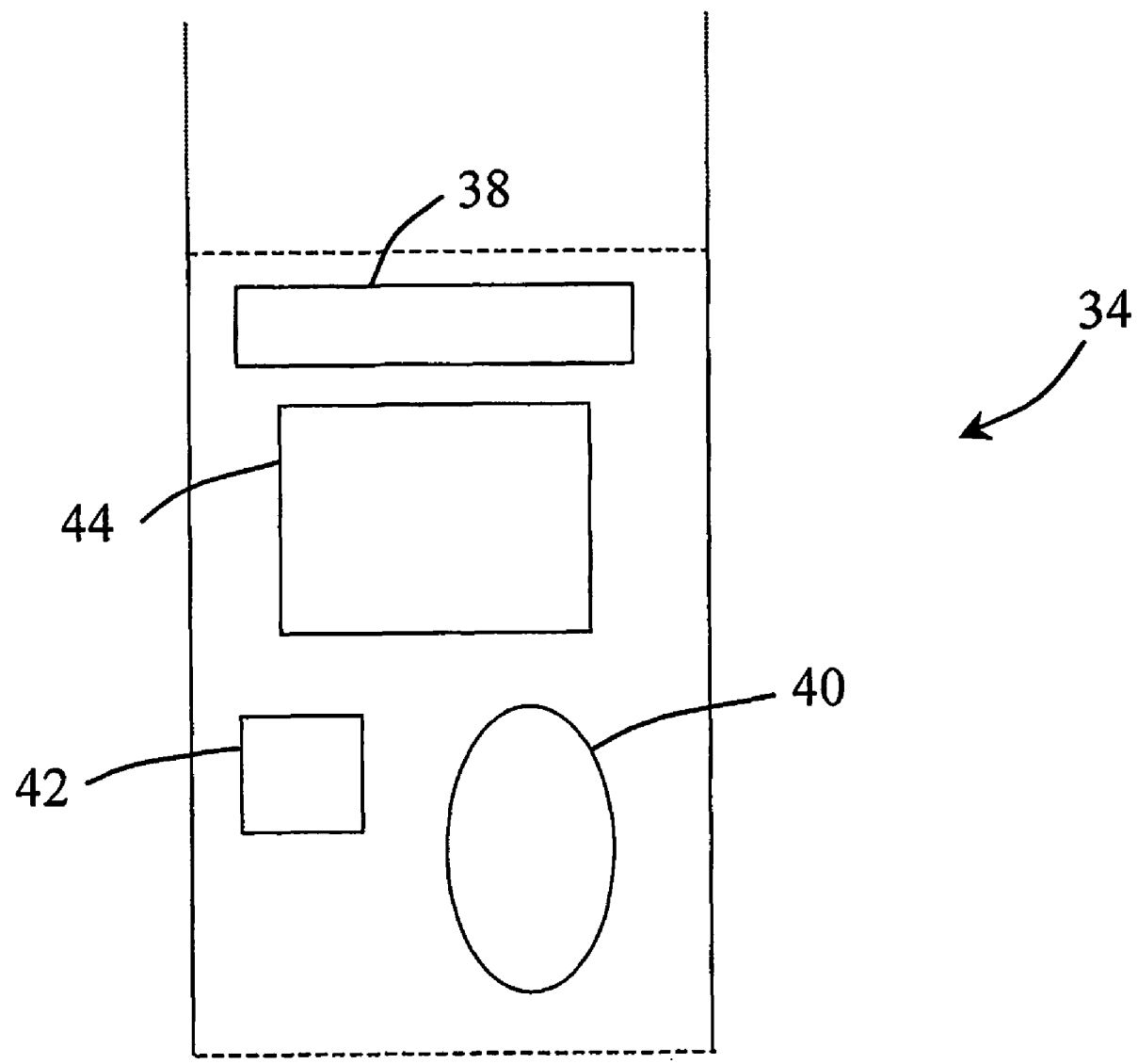
FIG. 4 is a diagrammatic representation of a seller identification device for use with the system shown in FIG. 1.

The seller identification device 34 is shown more particularly in FIG. 4 and includes a seller tag, in this example in the form of a seller RFID tag 38 on which is stored a unique seller identifier which is readable and which is indicative of the seller and of a representative of the seller. The seller representative may be a person engaged in selling items for the seller or may be a person authorised by the seller to verify item sale.

The seller identification device 34 also includes a seller biometric tag, in this example in the form of a visible representation of a fingerprint 40 of a seller representative, although it will be understood that the seller biometric tag may take various forms, including a second data storage device 42 arranged to store biometric data unique to a seller representative, and may include other types of biometric data such as a visible representation of an iris of the seller representative, a visible holographic representation of facial features of the seller representative, a representation of DNA of the seller representative, and so on.

In the present example, since the seller identification device 34 is in the form of a receipt, the seller identification device 34 also includes item details 44 indicative of the item purchased, the cost of the item, and so on.

It will be understood that the seller identification device may take various forms, the important aspect being that the seller identification device is capable of storing a seller identifier unique to the representative of the seller and biometric data unique to the representative of the seller. For example, the seller identification device may take the form of a credit card, an identity card or a mobile phone provided with a readable storage device such as an integrated circuit or an RFID tag on which a unique seller identifier and unique biometric data is stored.

Figure 5A:
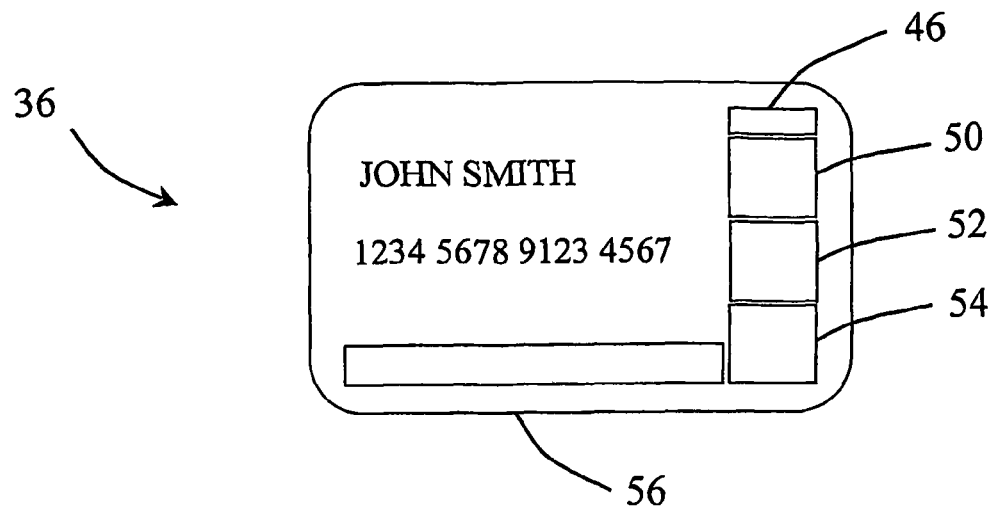
FIGS. 5a and 5b are diagrammatic front and rear representations respectively of a recipient identification device for use with the system shown in FIG. 1.
Figure 5B:
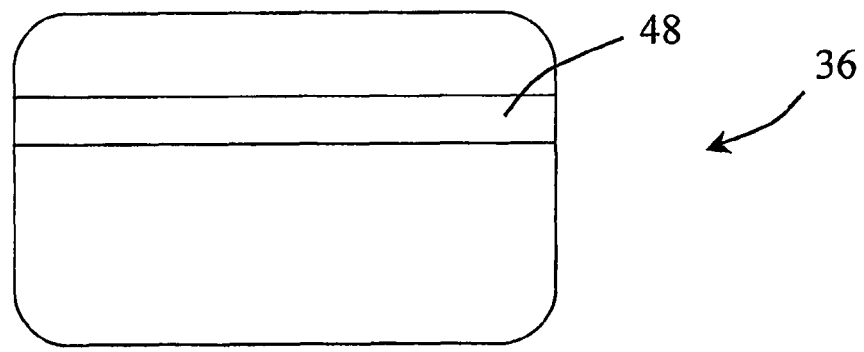

The recipient identification device 36 is shown more particularly in FIGS. 5*a* and 5*b* and includes a recipient tag, in this example in the form of a recipient RFID tag 46 on which is stored a unique recipient identifier which is readable and which is indicative of the recipient. In addition or as an alternative, the recipient tag may be in the form of a magnetic strip 48.

The recipient identification device 36 also includes a recipient biometric tag, in this example in the form of a visible representation of a fingerprint 50, although it will be understood that the recipient biometric tag may take various forms, including a third data storage device (not shown) for storing biometric data unique to a prospective item recipient, and may include other types of biometric data such as a visible representation of an iris of the recipient 52, a visible holographic representation 54 of facial features of the recipient, a representation 56 of DNA of the recipient, and so on.

In the present example, the recipient identification device 36 takes the form of a credit card although it will be understood that other alternatives are possible, the important aspect being that the recipient identification device 36 carries biometric data unique to the holder of the recipient identification device 36. Suitable alternatives include an identity card, a passport, or a mobile phone provided with a readable storage device such as an integrated circuit or an RFID tag on which is stored a unique recipient identifier and recipient biometric data.

The system 10 also includes a second scanner 58 for scanning and retrieving the manufacturer identifier and the seller identifier from the manufacturer tag 24 and the seller tag 38, a second detector 60 for detecting and reading biometric data stored in the seller biometric tag 40 and in the recipient biometric tag 50, a second biometric reader 62 for reading biometric data directly from a person, and a second computing device 64 for controlling and coordinating operation of the second scanner 58, the second detector 60 and the second biometric reader 67, and for forwarding information gathered from the second scanner 58, the second detector 60 and the second biometric reader 62 to the database 30.

In the present example, the second scanner 58, the second detector 60, the second biometric reader 62 and the second computing device 64 are located on site at a seller of the item 12.

The database 30 is accessible using any suitable communications network such as the Internet 32, the database 30 serving to receive and store information obtained by the first scanner 14, the first detector 16, the first biometric reader 18, the second scanner 58, the second detector 60 and the second biometric reader 62.

Figure 6:
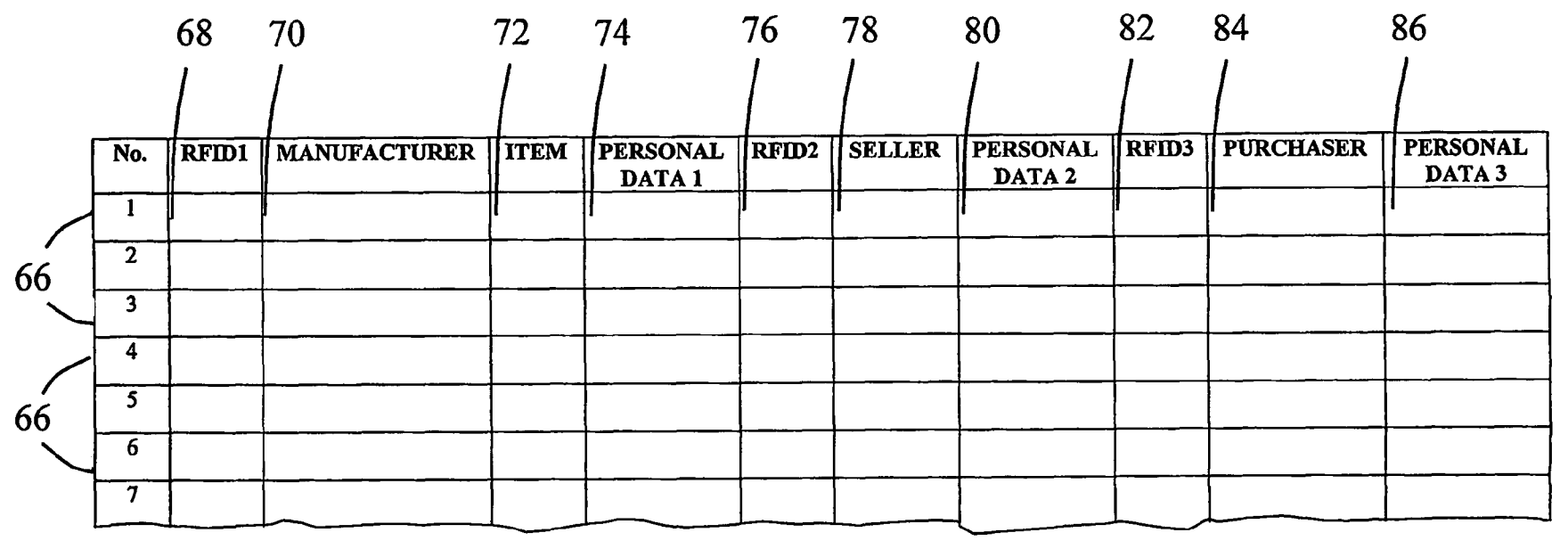

As shown more particularly in FIG. 6, the database 30 includes a plurality of records 66, in this example each record 66 including a manufacturer identifier 68 obtained from a manufacturer identification device 22 associated with an item 12, manufacturer information 70 indicative of the relevant manufacturer of the item and of the relevant representative of the manufacturer, item information 72 indicative of the relevant item, manufacturer biometric data 74 associated with the relevant representative of the manufacturer, a seller identifier 76 obtained from a seller identification device 34, seller information 78 indicative of the relevant seller and of the relevant representative of the seller, seller biometric data 80 associated with the relevant representative of the seller, a recipient identifier 82 obtained from a recipient identification device 36, recipient information 78 indicative of the relevant recipient, and recipient biometric data 80 associated with the relevant recipient.

The system 10 may also include a recipient location tag (not shown) which may be carried by a recipient or which may be incorporated into body tissue of the recipient, the recipient location tag being locatable by any suitable location tag detecting device and serving to monitor the location of the recipient. For example, the recipient location tag may be in the form of an integrated circuit which is detectable from a remote location, for example by using GPS locating technology. Such detected location information may also be stored in the database 30 and used for subsequent verification of the location of a recipient, for example for law enforcement purposes, for further verification of the identity of a recipient, a seller representative or a manufacturer representative, and so on.

Operation of the system 10 will now be described with reference to FIGS. 1 to 7.

Figure 7A:
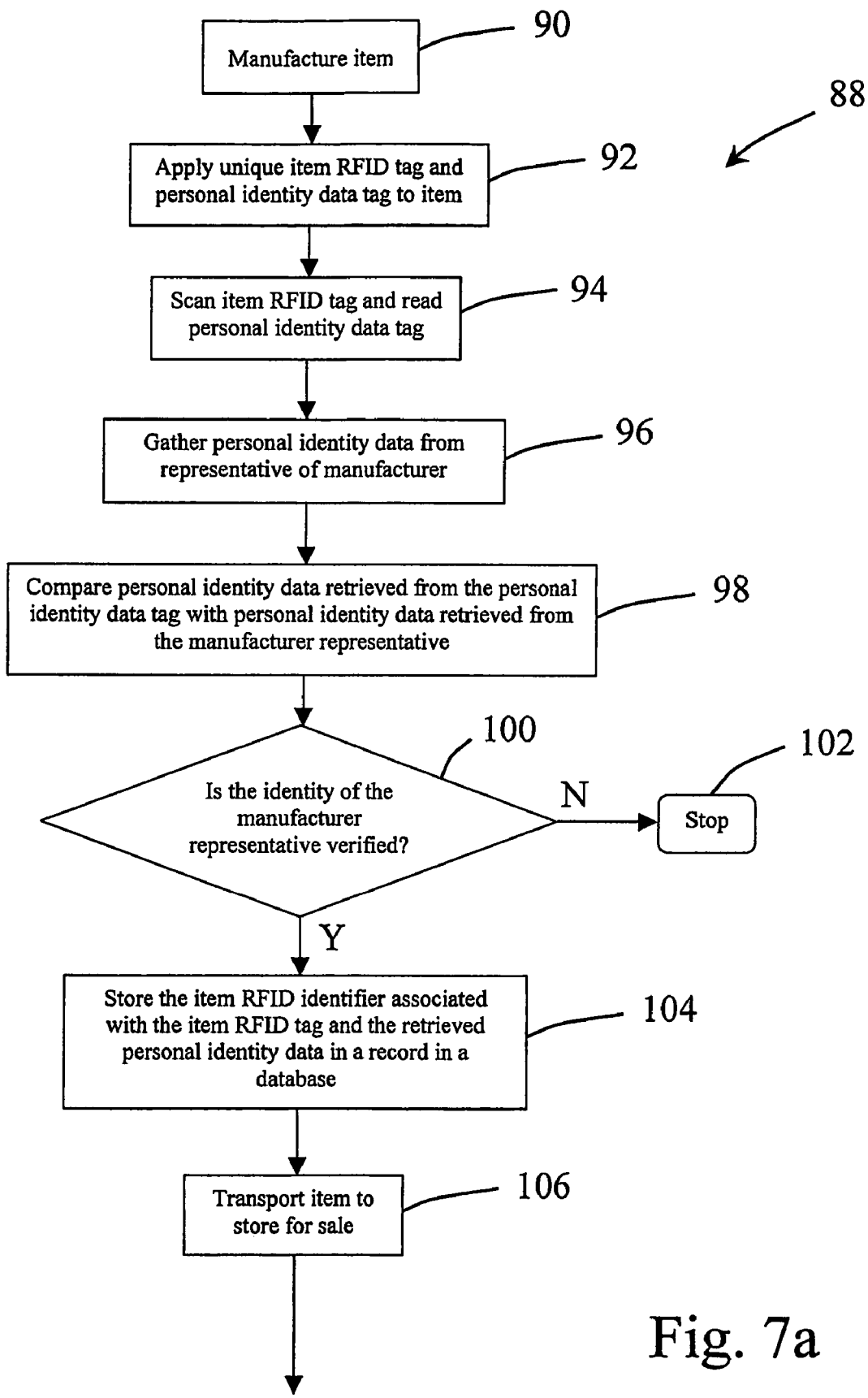
FIGS. 7a to 7c represent a flow diagram showing steps of operation of the system shown in FIG. 1, the steps being part of a method of monitoring supply of an item in accordance with an embodiment of the present invention.
Figure 7B:
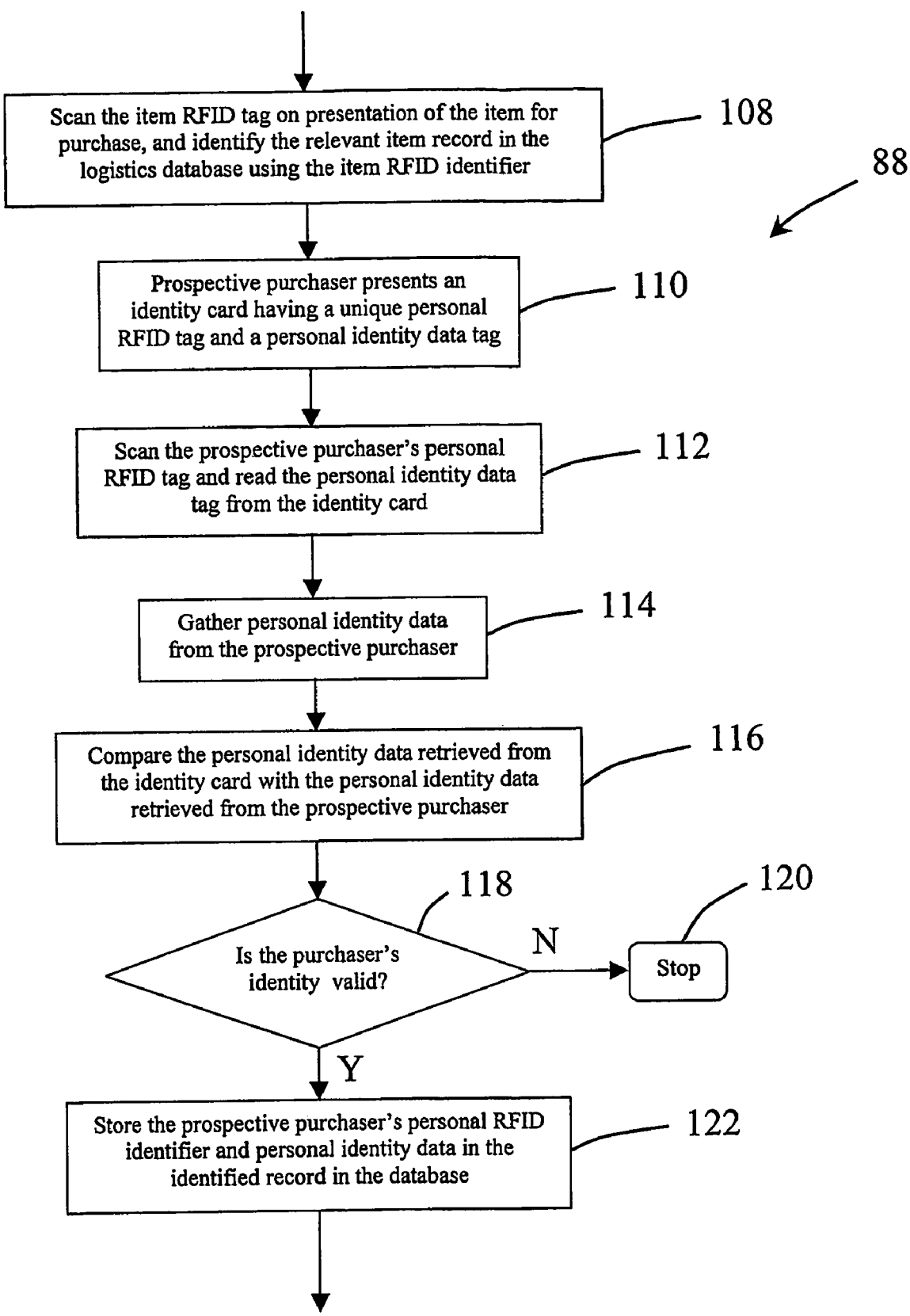
Figure 7C:
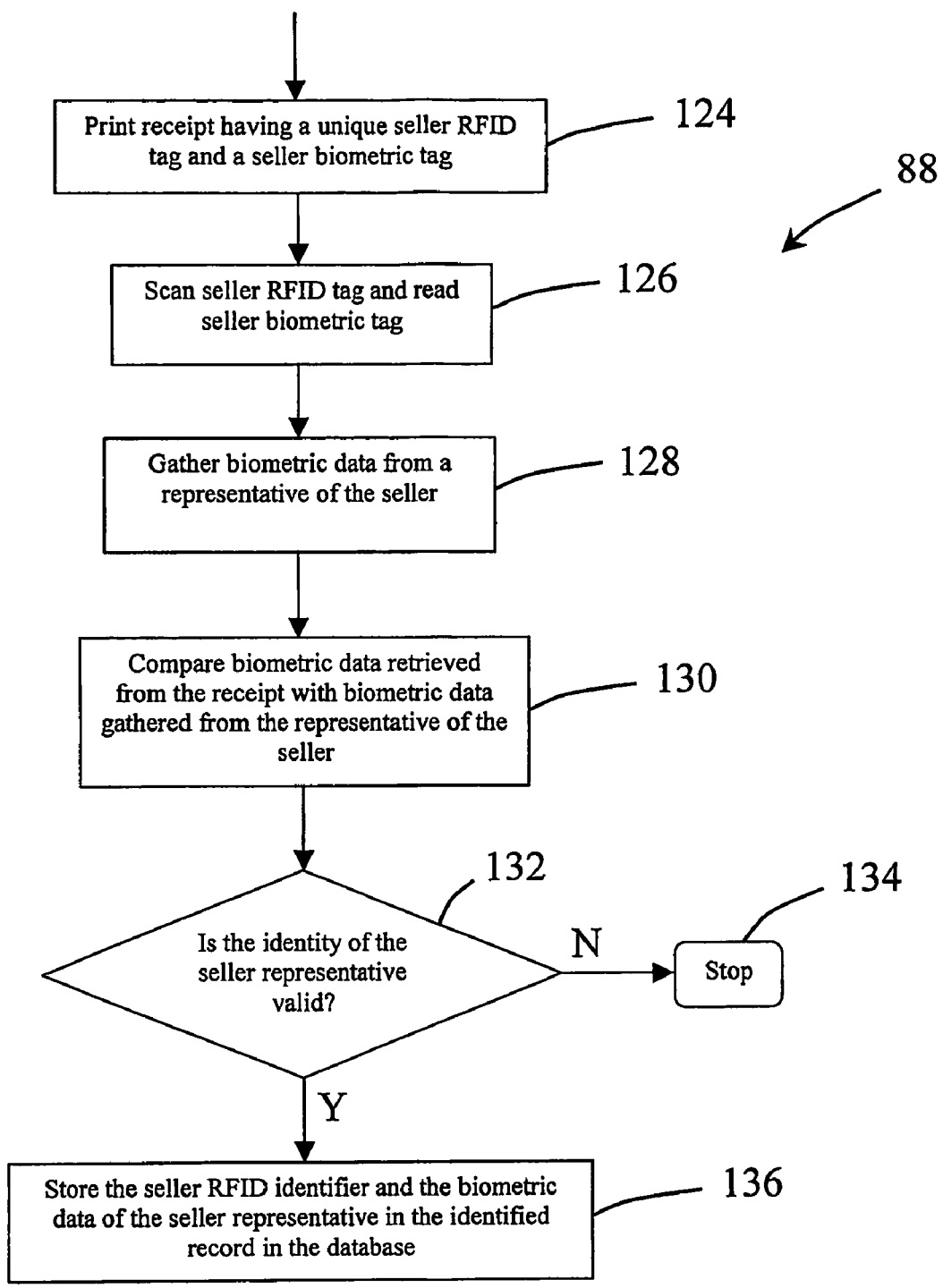

In FIGS. 7a to 7c, there is shown a flow diagram 88 illustrating a method of monitoring supply of an item 12 using the system 10.

As illustrated by the method steps 90 to 136 of the flow diagram 88, an item 12 is first manufactured and a manufacturer identification device 22 having, a manufacturer RFID tag 24 and a manufacturer biometric tag 26 is affixed to the item 12. The manufacturer identifier indicative of the relevant manufacturer and the relevant representative of the manufacturer is then retrieved from the manufacturer RFID tag 24 using the first scanner 14, and the manufacturer biometric data is retrieved from the manufacturer biometric tag 26 using the first detector 16. Prior to, during, or after completion of manufacture of the item 12, biometric data associated with the manufacturer representative is retrieved directly from the manufacturer representative using the first biometric reader 18. The manufacturer biometric data retrieved from the manufacturer biometric tag 26 is then compared with the biometric data retrieved directly from the representative of the manufacturer by the first computing device 20 in order to verify that the biometric data stored on the manufacturer identification device 22 corresponds to the biometric data retrieved directly from the manufacturer.

When the biometric data stored on the manufacturer identification device 22 is verified as corresponding to the biometric data of the manufacturer representative, details of the item 12, the manufacturer identifier, the manufacturer, the manufacturer representative, and the biometric data associated with the manufacturer representative are forwarded by the first computing device 20 to the database 30 for storage in a record in the database 30, in this example using the Internet 32.

In this way, by storing unique details of the item 12 and biometric data associated with a representative of the manufacturer of the item 12 in a record in the database, a link is established between the item 12 and an individual in the manufacturer organisation which enables the item 12 to be subsequently traced back to the individual.

The item is then transported to a seller, in this example a clothing store, for sale. When a prospective purchaser selects the item 12 for purchase and presents the item 12 to a representative of the seller, the seller representative scans the manufacturer RFID tag 24 so as to retrieve the unique manufacturer identifier stored on the item RFID tag 24 and identify the relevant item record in the database 30. The prospective purchaser then presents the prospective purchaser's credit card 36 to the seller representative. The seller representative scans the recipient RFID tag 46 so as to retrieve the recipient identifier indicative of the prospective purchaser from the recipient RFID tag 46 using the second scanner 58, and retrieves the recipient biometric data from the recipient biometric tag 50 using the second detector 60. The seller representative also retrieves recipient biometric data directly from the prospective purchaser using the second biometric reader 62. The recipient biometric data retrieved from the recipient RFID tag 46 is then compared with the recipient biometric data retrieved directly from the prospective purchaser by the second computing device 64 in order to verify that the recipient biometric data stored on the credit card 36 corresponds to the recipient biometric data received directly from the prospective purchaser.

When the recipient biometric data stored on the credit card 36 is verified as corresponding to the biometric data retrieved directly from the prospective purchaser, the recipient identifier, details of the recipient, and the biometric data associated with the recipient are forwarded by the second computing device 64 to the database 30 for storage in the relevant item record identified in the database 30, in this example using the Internet 32.

In this way, by storing biometric data associated with a recipient of the item 12 in the relevant item record 66 in the database 30, a link is established between the item 12 and a recipient of the item 12, in this example a purchaser of the item 12, which enables the valid owner of the item 12 to be recorded and subsequently traced for verification purposes.

Verification of the identity of the prospective purchaser also causes generation of a receipt 34 including a seller RFID tag 38, a seller biometric tag 40, and details of the item purchased. The seller representative then scans the seller RFID tag 38 so as to retrieve the seller identifier indicative of the seller and the representative of the seller using the second scanner 58, and retrieves the seller biometric data from the seller biometric tag 40 using the second detector 60. Prior to or during the process of selling the item 12, biometric data associated with the seller representative is retrieved directly from the seller using the second biometric reader 62. The seller biometric data retrieved from the seller biometric tag 40 is then compared with the biometric data retrieved directly from the representative of the seller by the second computing device 64 in order to verify that the biometric data stored on the receipt corresponds to the biometric data retrieved directly from the seller representative.

When the biometric data stored on the receipt 34 is verified as corresponding to the biometric data of the seller representative, the seller identifier, details of the seller and of the seller representative, and the biometric data associated with the seller representative are forwarded by the second computing device 64 to the database for storage in the relevant item record 66 identified in the database 30, in this example using the Internet 32.

In this way, by storing biometric data associated with a seller representative in the relevant item record in the database a link is established between the item 12 and an individual in the seller organisation which enables sale of the item to be subsequently traced back to the individual.

The system 10 may also be arranged to facilitate access to the records 66 stored in the database, for example using the Internet 32. In this way, an authorised user is able to monitor supply of an item to a recipient, to trace manufacture and/or sale of an item back to an individual involved in manufacture and/or sale of the item, and/or to verify the current legitimate owner of the item. Such access may be tailored to user type. For example, the system 10 may be arranged so as to enable manufacturers to access only records associated with items manufactured by the manufacturer, to enable sellers to access only records relating to items sold by the seller, and to enable recipients to access only records corresponding to items received by the recipient, for example as a result of purchasing the items. This may be facilitated using the relevant supplier and recipient identification devices, in the present example using the relevant manufacturer identification device, seller identification device and recipient identification device, and by providing an individual with access to the item records depending on whether the identify of the individual is verified using stored and recieved biometric data, and on the level of access attributed to the individual.

Although the above system is described in relation to purchase of an item, it will be understood that other variations are possible. For example, the recipient may receive the item from a supplier as a gift, as a prize in a competition, and so on.

It will be appreciated that although the system and method above are described in relation to a supply chain which includes a manufacturer, a seller and a recipient, it will be understood that other supply chain arrangements are possible. For example, the system may be arranged for use with a manufacturer and recipient only, such an arrangement being suitable when the manufacturer also sells items directly to purchasing recipients. As a further alternative, the system may be arranged for use with a seller and a purchasing recipient only, such an arrangement being suitable for pre-manufactured items. Furthermore, the system may be arranged for use with supply of items such as travel tickets. In this example, a travel ticket would be provided with an item identification device or a supplier identification device, and the recipient of the travel ticket provided with a recipient identification device, for example in the form of a credit card or passport having biometric data unique to the individual stored on the credit card or passport. As a still further alternative, the system may be arranged for use in tracking luggage by applying an item identification device or a supplier identification device to luggage and verifying the identity of the individual carrying the luggage using a recipient identification device associated with the individual at check-in and baggage retrieval. Other individuals handling the luggage during transportation may also be linked to the luggage using identification devices associated with the individuals if desired.

It will also be appreciated that the system and method of the present invention are also applicable to transactions which are carried out on-line between a seller located at a remote location relative to a purchaser. With this arrangement, the buyer would be provided with a scanner for scanning and reading stored purchaser identification information, a detector for detecting and reading stored biometric data, and a biometric reader for reading biometric data directly from the purchaser.

It will also be appreciated that although the above example is described in relation to a scanner 14, 58, a detector 16, 60, and a biometric reader 18, 62 which are separate to each other and to a computing device 20, 64, it will be understood that various arrangements are possible. For example, the scanner, detector and biometric reader may be incorporated into a single device, and may be incorporated into other devices such as a computing device, telephone system, television, and so on.

Furthermore, it will be appreciated that in order to track subsequent sales of an item, each person in a community may be provided with a recipient identification device, and a seller and purchaser of the item required to record the transfer of ownership of the item by verifying the identities of the seller and purchaser using the stored biometric data and biometric data gathered directly from the seller and purchaser. For example, the seller and purchaser may be required to visit a facility arranged to verify the identity of the seller and purchaser and to transfer details of the transfer of ownership to the relevant item record.

In the claims of this application and in the description of the invention, except where the context requires otherwise due to express language or necessary implication, the words "comprise" or variations such as "comprises" or "comprising" are used in an inclusive sense, i.e. to specify the presence of the stated features but not to preclude the presence or addition of further features in various embodiments of the invention.

Modifications and variations as would be apparent to a skilled addressee are deemed to be within the scope of the present invention.

The invention claimed is:

1. A system for monitoring an item, said system comprising:
 a plurality of item identification devices, each item identification device including unique information indicative of the item and being disposed during use on an item;
 a plurality of supplier identification devices, each supplier identification device including stored supplier biometric data indicative of the identity of a representative of a supplier of the item;
 means for verifying the identity of the representative of the supplier using the stored supplier biometric data and biometric data gathered directly from the representative of the supplier;
 a plurality of recipient identification devices, each recipient identification device being associated with a recipient of an item and including stored recipient biometric data indicative of the identity of the recipient;
 means for verifying the identity of a recipient using the stored recipient biometric data and biometric data gathered directly from the recipient; and
 a database for storing a plurality of item records, each item record including unique information indicative of an item, information indicative of the identity of the representative of a supplier of the item when the identity of the representative of the supplier has been verified, and information indicative of the identity of a recipient of the item when the identity of the recipient has been verified.

2. A system as claimed in claim 1, wherein each supplier identification device comprises a manufacturer identification device including stored manufacturer biometric data indicative of the identity of a representative of the manufacturer of the item, and the system further comprises:

a seller identification device including stored seller biometric data indicative of the identity of a representative of the seller of the item, and means for verifying the identity of the representative of the seller using the stored seller biometric data and biometric data gathered directly from the representative of the seller.

3. A system as claimed in claim 1, wherein each supplier identification device comprises a manufacturer identification device including stored manufacturer biometric data indicative of the identity of a representative of a manufacturer of the item.

4. A system as claimed in claim 3, wherein each manufacturer identification device includes a manufacturer tag capable of storing a manufacturer identifier indicative of the name of the manufacturer.

5. A system as claimed in claim 4, wherein each manufacturer identification device comprises an item identification device and each manufacturer identification device is disposed during use on an item.

6. A system as claimed in claim 4, wherein information indicative of the name of the representative of the manufacturer is stored on each manufacturer tag.

7. A system as claimed in claim 4, wherein the manufacturer tag comprises a manufacturer RFID tag.

8. A system as claimed in claim 4, further comprising a first scanner arranged to read the manufacturer tag.

9. A system as claimed in claim 1, wherein the item identification device is affixed to an item.

10. A system as claimed in claim 1, wherein the item identification device is incorporated into an item during manufacture of the item.

11. A system as claimed in claim 3, wherein the manufacturer identification device includes a manufacturer biometric tag and the manufacturer biometric data is stored in the manufacturer biometric tag in the form of at least one of a visible representation of a fingerprint, a visible representation of an iris, a visible holographic representation of facial features, and a representation of DNA.

12. A system as claimed in claim 3, wherein the manufacturer identification device includes a first data storage device and the manufacturer biometric data is stored in the first data storage device.

13. A system as claimed in claim 1, wherein the manufacturer identification device is incorporated in at least one of a mobile phone, a credit card, a passport and an identity card.

14. A system as claimed in claim 3, wherein the system further comprises a first detector arranged to read the manufacturer biometric data and a first biometric reader arranged to read biometric data directly from a manufacturer representative.

15. A system as claimed in claim 1, wherein each supplier identification device comprises a seller identification device including stored seller biometric data indicative of the identity of a representative of a seller of the item.

16. A system as claimed in claim 3, wherein each seller identification device comprises a seller tag capable of storing a seller identifier indicative of the name of a seller.

17. A system as claimed in claim 16, wherein information indicative of the name of the representative of the seller is stored in each seller tag.

18. A system as claimed in claim 16, wherein the seller tag comprises a seller RFID tag.

19. A system as claimed in claim 16, further comprising a second scanner arranged to read the seller tag.

20. A system as claimed in claim 15, wherein the seller identification device includes a seller biometric tag and the seller biometric data is stored in the seller biometric tag in the form of at least one of a visible representation of a fingerprint, a visible representation of an iris, a visible holographic representation of facial features, and a representation of DNA.

21. A system as claimed in claim 15, wherein the seller identification device includes a second data storage device and the seller biometric data is stored in the second data storage device.

22. A system as claimed in claim 15, wherein the seller identification device is included in a receipt provided by the seller to a recipient on purchase of an item.

23. A system as claimed in claim 15, wherein the seller identification device is incorporated in at least one of a mobile phone, a credit card, a passport or an identity card.

24. A system as claimed in claim 15, wherein the system further comprises a second detector arranged to read the seller biometric data and a second biometric reader arranged to read biometric data directly from a seller representative.

25. A system as claimed in claim 1, wherein each recipient identification device includes a recipient tag capable of storing a recipient identifier indicative of the name of the recipient.

26. A system as claimed in claim 1, wherein the recipient identification device is incorporated in at least one of a mobile phone, a credit card, a passport or an identity card.

27. A system as claimed in claim 1, wherein the recipient identification device comprises a recipient biometric tag and the recipient biometric data is stored in the recipient biometric tag in the form of at least one of a visible representation of a fingerprint, a visible representation of an iris, a visible holographic representation of facial features, or a representation of DNA.

28. A system as claimed in claim 1, wherein the recipient identification device includes a third data storage device and the recipient biometric data is stored in the third data storage device.

29. A system as claimed in claim 25 when dependent on claim 19, wherein the second scanner is arranged to read the recipient identifier.

30. A system as claimed in claim 24, wherein the second detector is arranged to read the recipient biometric data and the second biometric reader is arranged to read biometric data directly from a recipient.

31. A system as claimed in claim 1, wherein the supplier is a luggage handling organization, the recipient is an owner of the luggage, and the item is an article of luggage to be transported from one location to another location.

32. A system for monitoring an item, said system comprising:

a plurality of item identification devices, each item identification device including unique information indicative of the item and being disposed during use on an item;

a plurality of supplier identification devices, each supplier identification device including stored supplier biometric data indicative of the identity of a representative of a supplier of the item;

a processor programmed to verify the identity of the representative of the supplier using the stored supplier biometric data and biometric data gathered directly from the representative of the supplier;

a plurality of recipient identification devices, each recipient identification device being associated with a recipient of an item and including stored recipient biometric data indicative of the identity of the recipient;

a processor programmed to verify the identity of a recipient using the stored recipient biometric data and biometric data gathered directly from the recipient; and a database for storing a plurality of item records, each item record including unique information indicative of an item, information indicative of the identity of the representative of a supplier of the item when the identity of the representative of the supplier has been verified, and information indicative of the identity of a recipient of the item when the identity of the recipient has been verified.

* * * * *